United States Patent
Essigmann

(10) Patent No.: US 8,583,172 B2
(45) Date of Patent: Nov. 12, 2013

(54) DUAL MODE MOBILE TERMINAL ACCESS TO A WIRELESS COMMUNICATION NETWORK

(75) Inventor: Kurt Essigmann, Aachen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/321,360

(22) PCT Filed: May 28, 2009

(86) PCT No.: PCT/EP2009/056526
§ 371 (c)(1),
(2), (4) Date: Dec. 2, 2011

(87) PCT Pub. No.: WO2010/136066
PCT Pub. Date: Dec. 2, 2010

(65) Prior Publication Data
US 2012/0077540 A1 Mar. 29, 2012

(51) Int. Cl.
H04M 1/00 (2006.01)

(52) U.S. Cl.
USPC ........ 455/552.1; 455/560; 455/417; 370/352; 370/347

(58) Field of Classification Search
None
See application file for complete search history.

(56) References Cited

U.S. PATENT DOCUMENTS

| 6,343,220 | B1 | 1/2002 | Van Der Salm | |
|---|---|---|---|---|
| 2002/0114317 | A1* | 8/2002 | Dorenbosch et al. | 370/352 |
| 2004/0005862 | A1* | 1/2004 | Tanaka | 455/39 |
| 2006/0046750 | A1* | 3/2006 | Deschenes | 455/462 |
| 2007/0049342 | A1 | 3/2007 | Mayer et al. | |
| 2007/0274284 | A1* | 11/2007 | Dendukuri et al. | 370/351 |
| 2008/0045224 | A1* | 2/2008 | Lu et al. | 455/446 |
| 2008/0070619 | A1* | 3/2008 | Yu | 455/552.1 |

* cited by examiner

Primary Examiner — Rafael Pérez-Gutiérrez
Assistant Examiner — Keith Fang
(74) Attorney, Agent, or Firm — Coats & Bennett, P.L.L.C.

(57) ABSTRACT

The present invention is directed to connecting a dual mode mobile terminal to a wireless communication network and includes connecting a dual mode mobile terminal to a wireless communication network using a mobile attachment mode or a fixed attachment mode. This includes detecting an operative transfer state of the dual mode mobile terminal triggering a transfer from the mobile attachment mode to the fixed attachment mode, and achieving a mobile attachment mode detach from the wireless communication network in the mobile attachment mode upon detection of the operative transfer state. This also includes achieving a fixed attachment mode attach to the same wireless communication network subsequent to execution of the mobile attachment mode detach to initiate the fixed attachment mode.

15 Claims, 7 Drawing Sheets

DUAL MODE MOBILE TERMINAL ACCESS TO A WIRELESS COMMUNICATION NETWORK

TECHNICAL FIELD

The present invention relates to an approach to dual mode mobile terminal access to a wireless communication network, a related dual mode mobile terminal, and a related switching node operated in a wireless communication network.

BACKGROUND

Analysis shows that today 68% of wireless calls are made from home. Here, mobility is not a concern for these wireless calls, while price per minute and voice quality is. At the same time operators of wireless communication networks suffer from VoIP Voice Over IP Internet Protocol offers or from ISP Internet Service Provider-type operators that operate at a much lower cost per minute as classical mobile communication network operators can afford.

In view of this, currently there exist many proposals on how residential mobile users can be connected to wireless communication networks, e.g., mobile GSM/WCDMA networks, avoiding the expensive already installed outdoor radio coverage. Examples for such proposals are Unlicensed Mobile Access UMA, Femto indoor base stations, and WiMax.

However, all solutions as outlined above are expensive both for the operator and the subscriber as they require new equipment in the network, e.g., UMA, WiFi, or new equipment in the residential area of the subscriber, e.g., Pico- or Femto base transceiver stations BTS.

Further, while the above-mentioned solutions aim at full mobility, seamless access and call continuation, i.e. handover between the residential radio and the public radio coverage, this convenience comes at the cost of high installation cost. To the contrary, analysis has shown that full mobility and seamless call continuation is of no concern for residential subscribers calling mostly from home.

SUMMARY

In view of the above the object of the present invention is to provide a simpler mechanism to connect a dual mode mobile terminal to a wireless communication network.

According to a first aspect of the present invention there is provided a method of connecting a dual mode mobile terminal to a wireless communication network using a mobile attachment mode or a fixed attachment mode. The method according to the first aspect of the present invention comprises the steps of detecting an operative transfer state of the dual mode mobile terminal triggering a transfer from the mobile attachment mode to the fixed attachment mode, executing a mobile attachment mode detach from the wireless communication network in the mobile attachment mode upon detection of the operative transfer state, and executing a fixed attachment mode attach to the same wireless communication network subsequent to execution of the mobile attachment mode detach to initiate the fixed attachment mode.

According to a second aspect of the present invention there is provided a dual mode mobile terminal being connectable to a wireless communication network using a mobile attachment mode or a fixed attachment mode. The dual mode mobile terminal comprises an access mode control unit adapted to detect a operative transfer state of the dual mode mobile terminal triggering a transfer from the mobile attachment mode to the fixed attachment mode, a mobile mode attachment unit adapted to execute a mobile attachment mode detach from the wireless communication network to terminate the mobile attachment mode upon detection of the operative transfer state, and a fixed mode attachment unit adapted to execute a fixed attachment mode attach to the same wireless communication network to initiate the fixed attachment mode subsequent to execution of the mobile attachment mode detach.

According to a third aspect of the present invention there is provided a method of operating a switching node operated in a wireless communication network to establish a connection to a dual mode mobile terminal being connectable to the wireless communication network using a mobile attachment mode or a fixed attachment mode. The method according to the third aspect of the present invention comprises the steps of detecting an attachment mode of the dual mode mobile terminal as the mobile attachment mode or the fixed attachment mode and exchanging control information with the dual mode mobile terminal according to the detected attachment mode.

According to a fourth aspect of the present invention there is provided a switching node operated in a wireless communication network to establish a connection to a dual mode mobile terminal being connectable to the wireless communication network using a mobile attachment mode or a fixed attachment mode. The switching node comprises an access mode control unit adapted to detect an attachment mode of the dual mode mobile terminal as the mobile attachment mode or the fixed attachment mode and a communication unit adapted to exchange control information with the dual mode mobile terminal according to the detected attachment mode.

BRIEF DESCRIPTION OF THE DRAWINGS

In the following the present invention will be explained with reference to the drawing in which.

DETAILED DESCRIPTION

Figure 1:
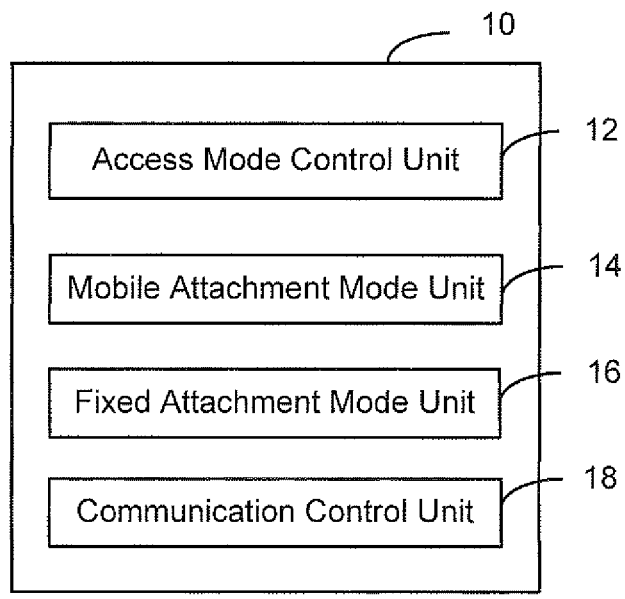
FIG. 1 shows a schematic diagram of a dual mode mobile terminal according to the present invention.

In the following the present invention and preferred embodiments thereof will be explained with reference to the drawing. It should be understood that as far as certain aspects of the present invention are disclosed that these may be implemented in any appropriate way, i.e. in software, in hardware, or any combination thereof.

Also, in the following the terms dual mode mobile terminal, mobile attachment mode, fixed attachment mode, and operative transfer state of a dual mode mobile terminal triggering a transfer from the mobile attachment mode to the fixed attachment mode will be used.

Here, a dual mode mobile terminal in the sense of the present invention may be any type of mobile terminal supporting two different communication modes, e.g., standard wireless communication or Internet Protocol based communication. Also, dual mode mobile terminal is not restricted to any particular type of terminal, and maybe, e.g., a mobile phone, a PDA, a laptop, etc.

Further, mobile attachment mode is related to an operative state of the dual mode mobile terminal with available access to a wireless communication network through the radio access network thereof. E.g., mobile attachment mode may be enabled by using GSM, 3GPP Third Generation Partnership Project, etc. defined call setup procedure or any other standard services generally provided through these wireless communication networks using the related radio access network.

Further, fixed attachment mode is related to an operative state of the dual mode mobile terminal with access to the wireless communication network while bypassing the radio access network thereof. E.g., the fixed attachment mode may be related to use, e.g., a call setup procedure over IP over DSL Digital Subscriber Line and may enable to use voice over IP over DSL, as will be explained in more detail below.

Further, the operative transfer state of the dual mode mobile terminal triggering the transfer from the mobile attachment mode to the fixed attachment mode is related to one or more pre-determined operative states of the dual mode mobile terminal. E.g., when a subscriber plugs his dual mode mobile terminal into a special cradle that is connected to the Internet via DSL, the dual mode mobile terminal may detach from the wireless communication network according to the, e.g., IMSI International Mobile Subscriber Identity detach procedure and may attach again, e.g., via DSL to the same wireless communication network using a gateway node of the wireless communication network.

FIG. 1 shows a schematic diagram of a dual mode mobile terminal 10 according to the present invention.

As shown in FIG. 1, the dual mode mobile terminal 10 according to the present invention comprises an access mode control unit 12, a mobile attachment mode unit 14, a fixed attachment mode unit 16, and a communication control unit 18.

The access mode control unit 12 is adapted to detect an operative transfer state of the dual mode mobile terminal triggering a transfer from the mobile attachment mode to the fixed attachment mode and vice versa.

Further, the mobile mode attachment unit 14 is adapted to execute a mobile attachment mode detach from the wireless communication network to terminate the mobile attachment mode upon detection of the operative transfer state triggering a transfer from the mobile attachment mode to the fixed attachment mode. Further, upon loss of fixed attachment mode connectivity the mobile mode attachment unit 14 is adapted to execute a mobile attachment mode attach to the same wireless communication network.

Further, the fixed mode attachment unit 16 is adapted to execute a fixed attachment mode attach to the same wireless communication network to initiate the fixed attachment mode subsequent to execution of the mobile attachment mode detach.

Further, the communication control unit 18 is adapted to receive an attachment time period upon a successful fixed attachment mode attach from the wireless communication network for confirmation of fixed attachment mode availability.

Further, the communication control unit 18 is adapted to execute a call setup in the fixed attachment mode by using a fixed communication connectivity via a gateway node of the wireless communication network.

Further, the communication control unit 18 is adapted to execute a call receipt in the fixed attachment mode by using the fixed communication connectivity via gateway node of the wireless communication network.

Figure 2:
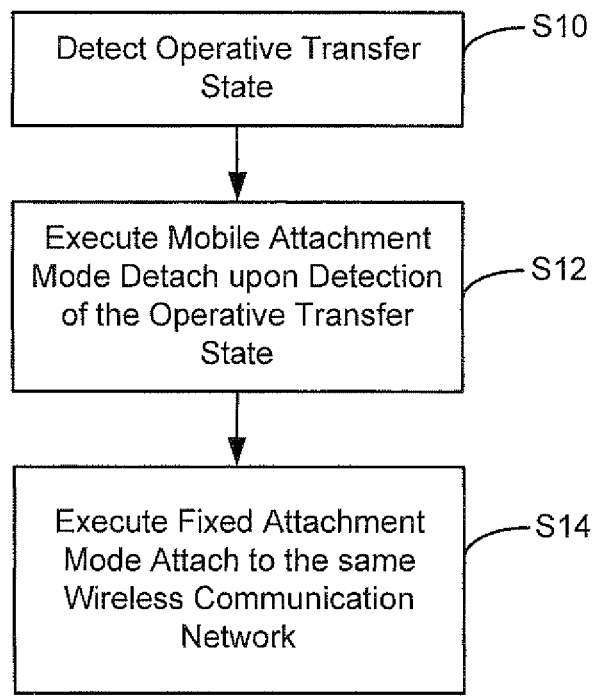
FIG. 2 shows a flowchart of operation for the dual mode mobile terminal shown in FIG. 1.

FIG. 2 shows a flowchart of operation for the dual mode mobile terminal 10 shown in FIG. 1. In more detail, the dual mode mobile terminal 10 is executing a method of connecting the dual mode mobile terminal 10 to the wireless communication network using a mobile attachment mode or a fixed attachment mode.

As shown in FIG. 2, the method comprises a step S10, operatively executed by the access mode control unit 12 shown in FIG. 1, of detecting an operative transfer state of the dual mode mobile terminal triggering a transfer from the mobile attachment mode to the fixed attachment mode.

As shown in FIG. 2, the method comprises a step S12, operatively executed by the mobile attachment mode unit 14 shown in FIG. 1, of executing a mobile attachment mode detach from the wireless communication network in the mobile attachment mode upon detection of the operative transfer state.

As shown in FIG. 2, the method comprises a step S12, operatively executed by the fixed attachment mode unit 16 shown in FIG. 1, of executing a fixed attachment mode attach to the same wireless communication network subsequent to execution of the mobile attachment mode detach to initiate the fixed attachment mode.

Figure 3:
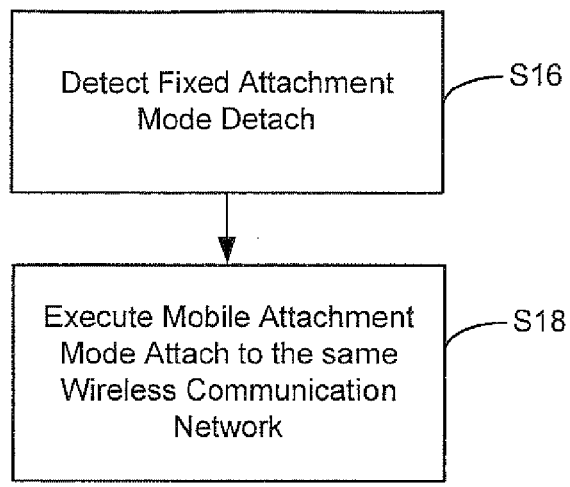
FIG. 3 shows a further flowchart of operation for the dual mode mobile terminal shown in FIG. 1.

FIG. 3 shows a further flowchart of operation for the dual mode mobile terminal 10 shown in FIG. 1. It should be noted that the method steps shown in FIG. 3 may be executed in combination with the method steps described with respect to FIG. 2.

As shown in FIG. 3, the method comprises a step S16, operatively executed by the fixed attachment mode unit 14 shown in FIG. 1, of detecting a fixed attachment mode detach from the wireless communication network.

As shown in FIG. 3, the method comprises a step S18, operatively executed by the fixed attachment mode unit 14 shown in FIG. 1, of executing a mobile attachment mode attach to the same wireless communication network subsequent to execution of the fixed attachment mode detach to initiate the mobile attachment mode.

It should be noted that the method steps shown in FIG. 2 and FIG. 3 and as explained above may be supplemented by the steps of receiving an attachment time period upon a successful fixed attachment mode attach from the wireless communication network for confirmation of fixed attachment mode availability, after executing a call setup in the fixed attachment mode by using a fixed communication connectivity via a gateway node of the wireless communication network, and/or executing a call receipt in the fixed attachment mode by using the fixed communication connectivity via gateway node of the wireless communication network.

In the following some illustrative examples of transfer from a mobile attachment mode to a fixed attachment mode will be explained.

E.g., when a mobile phone MS/UE is disconnected from an entity to provide fixed mode connectivity to the mobile phone MS/UE, e.g., a WLAN access point or a special cradle, at the end of the fixed communication mode the mobile phone ME/UE may IMSI attach via a 2G/3G radio access network of the wireless communication network again in the mobile attachment mode.

Further, while a connection to a special cradle has been given as example, as alternative the operative transfer state could as well be availability of access to a fixed access point, whether by wire or wirelessly.

Here, the present invention covers a new procedure between the dual-mode mobile terminal 10 and the special cradle or the fixed access point, as well as the control and payload transport mechanisms to the operator's core network.

E.g., when a subscriber plugs his dual mode mobile terminal into a special cradle that is connected to the Internet via DSL, the dual mode mobile terminal may detach from the wireless communication network using a IMSI detach procedure and may attach again via DSL to the same wireless communication network, e.g., via a new "Cable Attach Procedure".

Further, in this state, any calls performed by this dual mode mobile terminal 10 may use the 3GPP defined call setup procedure wherein control signalling is transported over IP over DSL and will use voice over IP over DSL.

Further, when the dual mode mobile terminal 10 is disconnected from, e.g., the WLAN access point or the special cradle, the ME/UE will detach from the wireless communication network and will IMSI attach via the wireless communication network's 2G/3G radio access network again.

Therefore, the present invention may cover this new procedure between the dual mode mobile terminal 10 and the special cradle, as well as the control and payload transport mechanisms to the wireless communication network operator's core network.

In view of the above, the present invention overcomes difficulties with currently available mobile terminals where there is no other possibility as to connect the mobile terminal to the operator's wireless communication network than via the 2G/3G or other radio accesses. For instance UMA and some other solutions have proposed the usage of gateways that convert protocols such as SIP between non 2G/3G radio accesses and the 3GPP-specified core network.

In contrast to that, the present invention provides a new type of dual mode mobile terminal, e.g., for 2G or 3G, which can connect to the core network, e.g., via the 2G/3G radio access, following the 3GPP specification, or via a plain IP network that is connected to the operators core network.

In the following the first mobile attachment mode of operation is, e.g., the 3GPP method, and will be also referred to as "IMSI Attached Mode" in the following. The second fixed attachment mode may be, e.g., an "IP Attached Mode".

It should be noted that when in "IP Attached Mode" the dual mode mobile terminal 10 may have access to all services, e.g., Bearer, Tele- and supplementary services, Camel, Prepaid, etc., that are available to it in the "IMSI Attached" mode.

Figure 4:
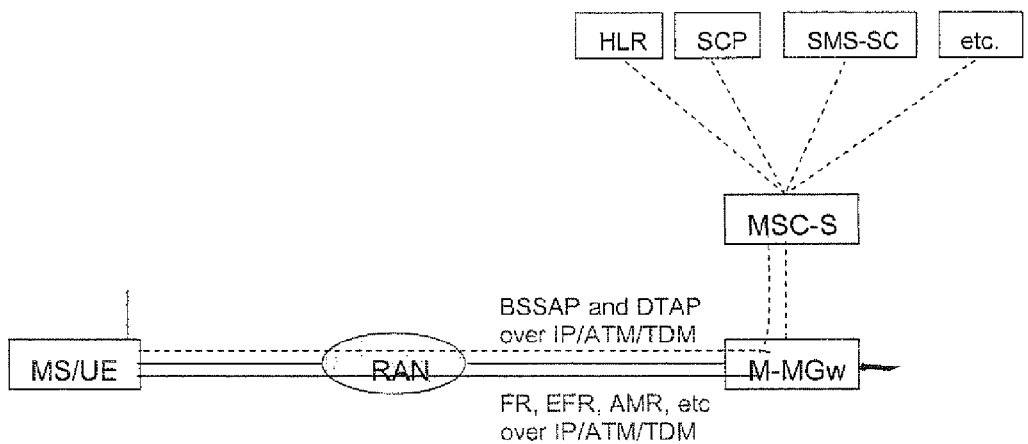
FIG. 4 shows an example of a mobile attachment mode and related connectivity according to the present invention.

FIG. 4 shows an example of a mobile attachment mode and related connectivity according to the present invention.

As shown in FIG. 4, the mobile attachment mode relies on a connectivity method of the "IMSI Attached Mode" and will not be further described as it follows the 3GPP specification.

Figure 5:
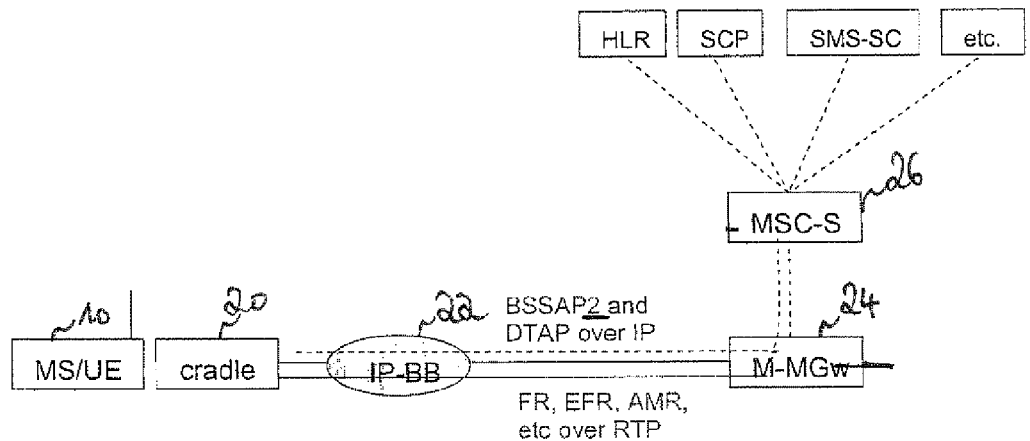
FIG. 5 shows an example of a fixed attachment mode and related connectivity according to the present invention.

FIG. 5 shows an example of a fixed attachment mode and related connectivity according to the present invention.

As shown in FIG. 5, in "IP Attached Mode" as an example for the fixed attachment mode, the dual mode mobile terminal 10 may be connected physically to a cradle 20 that is connected to the public IP-BackBone 22, also referred to as IP-BB in the following, via, e.g., DSL.

As shown in FIG. 5, a media gateway M-MGw 24 of the serving mobile operator has connectivity to the public IP-BackBone 22. In this mode of operation, all signalling and all payload traffic between the wireless communication network and the dual mode mobile terminal 10 is carried via the cradle 20 and via the public IP-BackBone 22 while bypassing the 2G/3G radio access completely.

As shown in FIG. 5, both control signalling and payload may be transported in the fixed attachment mode over the IP-BackBone 22 towards the media gateway 24. The media gateway may relay the control signalling information to a switching node 26, e.g., a MSC-S, over, e.g., the Mc-i/f, and may handle the voice payload including transcoding, etc.

As shown in FIG. 5, the media gateway 24 may provide a mechanism and procedure that allows detecting an incoming IP stream as signalling messages—these uplink messages will be relayed to the switching node 26, e.g., the MSC-S transparently. In the downlink, signalling messages are received from the switching node 26 and relayed transparently by the media gateway 24 to the dual mode mobile terminal 10.

Figure 6:
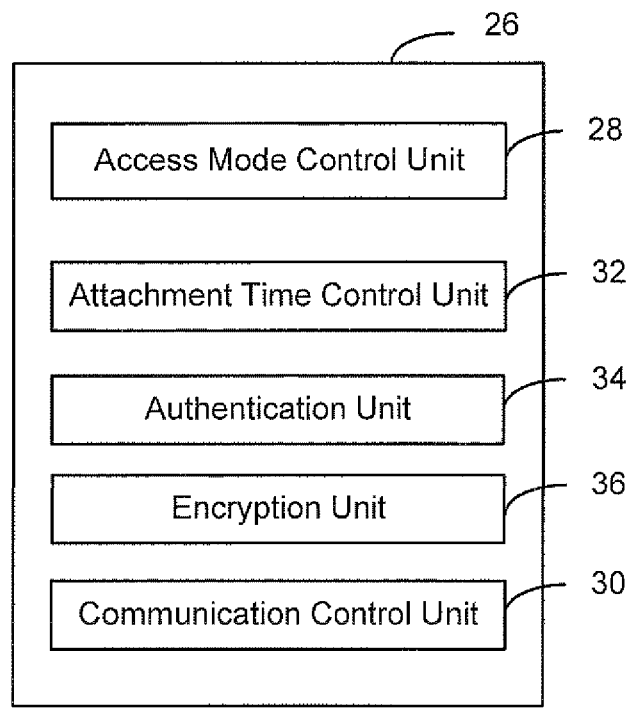
FIG. 6 shows a schematic diagram of a switching node operated in a wireless communication network according to the present invention.

FIG. 6 shows a schematic diagram of a switching node 26 operated in a wireless communication network according to the present invention, e.g., as shown in FIG. 5.

As shown in FIG. 6, the switching node 26 comprises an access mode control unit 28 and a communication control unit 30. As an option, the switching node 26 comprises an attachment time control unit 32, an authentication unit 34, and an encryption unit 36.

Here, the access mode control unit 28 is adapted to detect a attachment mode of the dual mode mobile terminal 10 as the mobile attachment mode or the fixed attachment mode.

Further, the communication control unit 30 is adapted to exchange control information with the dual mode mobile terminal according to the detected attachment mode.

Further, the attachment time control unit 32 is adapted to forward an attachment time period to the dual mode mobile terminal for confirmation of fixed attachment mode availability.

Further, the authentication unit 34 is adapted to verify authentication of a dual mode mobile terminal user prior to initiation of the fixed attachment mode.

Further, the encryption unit 34 is adapted to encrypt control information prior to forwarding thereof to the dual mode mobile terminal 10 operating in the fixed attachment mode.

It should be noted that the access mode control unit 28 may provide a mechanism and procedure to identify a dual mode mobile terminal 10 as being in the "IP Attached Mode". In this mode, the communication control unit may divert all downlink signalling messages to the dual mode mobile terminal 10 not via the RAN Radio Access Network but via the media gateway 24 that may relay the messages as described above with respect to FIG. 5.

Also, it should be noted that according to the present invention there is proposed a new protocol, a modified BSSAP Base Station Subsystem Application Part protocol, that allows the dual mode mobile terminal 10 to attach via IP to the core network and that can be transported via IP. The new BSSAP2 protocol may provide for user authentication and control information encryption.

Figure 7:
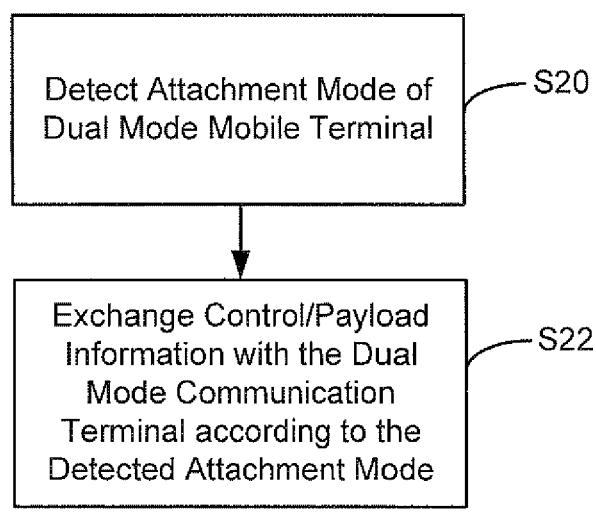
FIG. 7 shows a flowchart of operation for the switching node shown in FIG. 6.

FIG. 7 shows a flowchart of operation for the switching node shown in FIG. 6.

As shown in FIG. 7, the method comprises a step S20, operatively executed by the access mode control unit 28 shown in FIG. 6, of detecting an attachment mode of the dual mode mobile terminal 10 as the mobile attachment mode or the fixed attachment mode.

As shown in FIG. 7, the method comprises a step S22, operatively executed by the communication control unit 30 shown in FIG. 6, of exchanging control information with the dual mode mobile terminal 10 according to the detected attachment mode.

Figure 8:
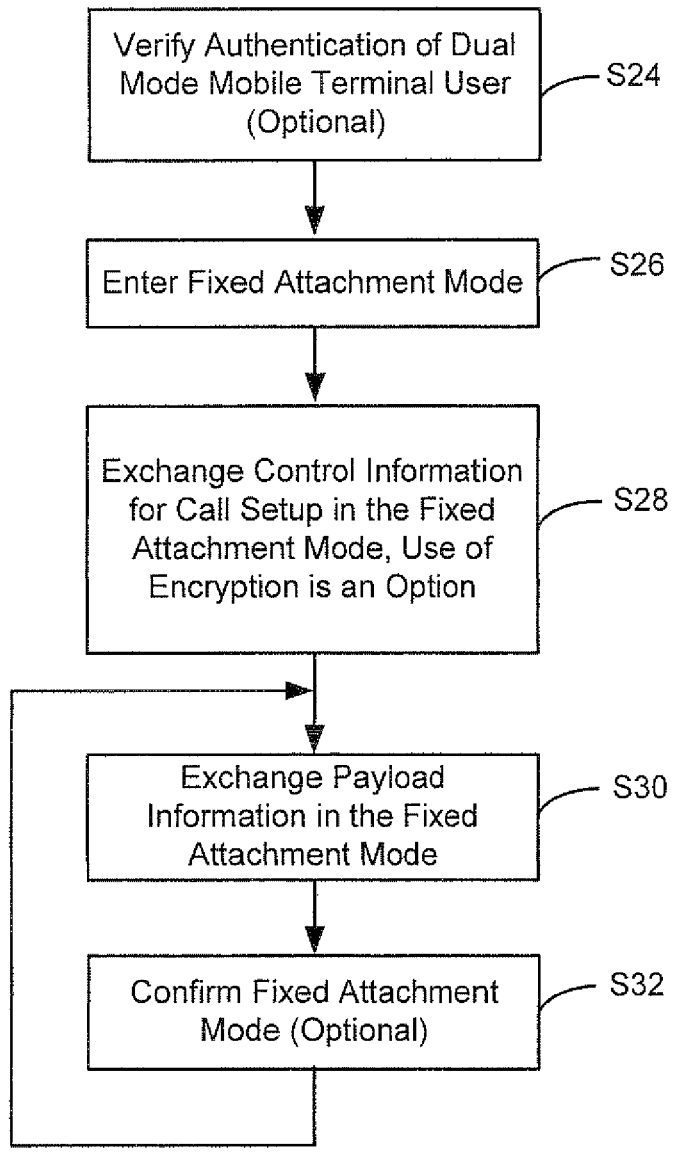
FIG. 8 shows a further flowchart of operation for the switching node shown in FIG. 6.

FIG. 8 shows a further flowchart of operation for the switching node shown in FIG. 6. It should be noted that the method steps shown in FIG. 8 may be executed in combination with the method steps described with respect to FIG. 9.

As shown in FIG. 8, the method optionally comprises a step S24, operatively executed by the authentication unit 34 shown in FIG. 6, of verifying authentication of a dual mode mobile terminal user prior to initiation of the fixed attachment mode. The method further comprises a step S26, operatively executed by the access mode control unit 28 shown in FIG. 6, of entering the fixed attachment mode, e.g., upon successful user authentication.

As shown in FIG. 8, the method comprises a step S28, operatively executed by the communication control unit 30 shown in FIG. 6, of exchanging control information for call setup, e.g., a dual mode mobile terminal originating call in the fixed attachment mode, or a dual mode mobile terminal terminating call in the fixed attachment mode. Here, use of encryption for the exchange of control information may be an option according to the present invention. Preferably, the control information is exchanged via the gateway node 24 of the wireless communication network and using fixed communication connectivity, as shown in FIG. 5.

As shown in FIG. 8, the method comprises a step S30, operatively executed under control of the communication control unit 30 shown in FIG. 6, of exchanging payload information in the fixed attachment mode. The method further comprises a step S32, operatively executed by the attachment time control unit 32 shown in FIG. 6, of forwarding an attachment time period to the dual mode mobile terminal 10 for confirmation of fixed attachment mode availability. Upon receipt of feedback from the dual mode mobile terminal 10, this allows to confirm availability of a fixed attachment mode.

Figure 9:
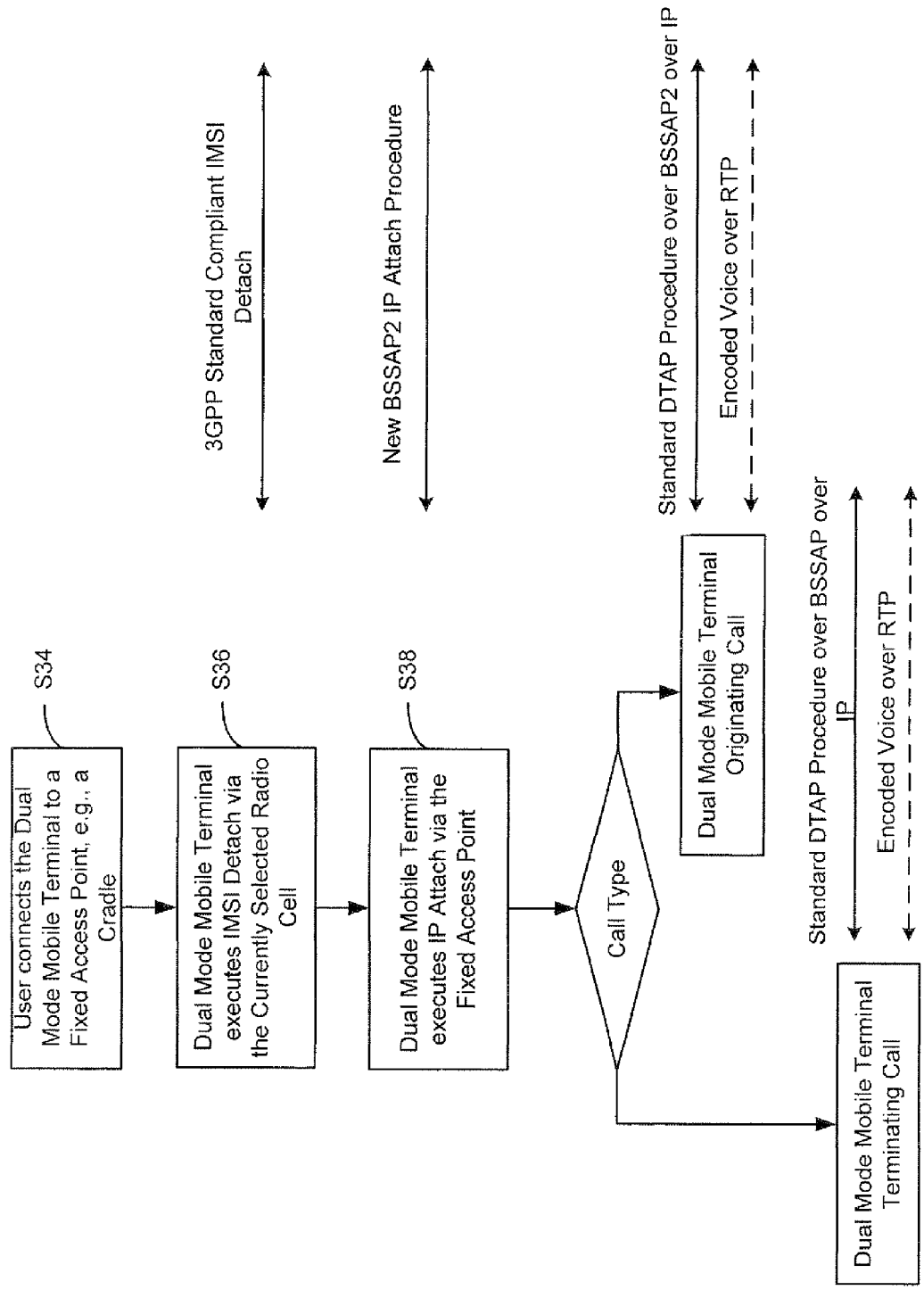
FIG. 9 shows an example of a transfer from mobile attachment mode to fixed attachment mode according to the present invention.

FIG. 9 shows an example of a transfer from mobile attachment mode to fixed attachment mode according to the present invention.

Regarding connectivity and support in the wireless communication network, FIG. 9 shows related mobile terminating call and mobile originating call processes.

As shown in FIG. 9, the dual mode mobile terminal 10 may provide a mechanism to detect while being in the "IMSI Attached Mode", that it is connected, e.g., via a cradle, to a public IP network, see step S34.

As shown in FIG. 9, in that condition the dual mode mobile terminal may first IMSI detach from the wireless communication network, see step S36, following the 3GPP procedures, e.g., 3GPP TS 24.008. When this procedure is successfully executed, it may start the "IP Attach Procedure", see step S38, by sending the appropriate messages via a protocol which allows to perform control signalling over a fixed access. In part the functionality may correspond to the BSSAP protocol and is thus denoted by BSSAP2 in the following As shown in FIG. 9, the type of handling the details of the standard DTAP Direct Transfer Application Part control signalling procedure depend on the call type, e.g., dual mode mobile terminal terminating call or dual mode mobile terminal originating call.

Figure 10:
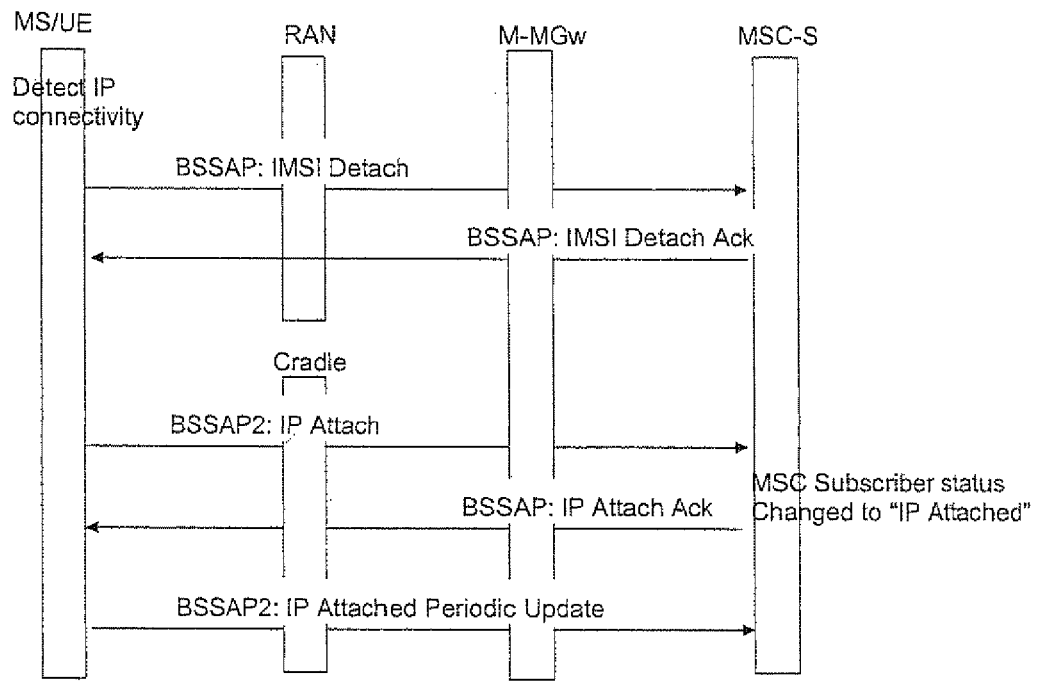
FIG. 10 shows an example of a fixed attachment mode control message flow according to the present invention.

FIG. 10 shows an example of a fixed attachment mode control message flow according to the present invention.

Further to the steps explained with respect to FIG. 9, when the IP Attach procedure is successfully executed, the dual mode mobile terminal starts a timer and upon expiration of this timer will send a BSSAP2 "IP Attach Periodic" message to confirm its availability via IP to the network. The timer value is determined by the wireless communication network and included in the BSSAP2 "IP Attach ACK" message.

If the BSSAP2 "IP Attach Periodic" message is not received by the switching node MCS-S for a time period longer than two times the periodic update timer, then the dual mode mobile terminal 10 is marked as "Unavailable". An IMSI Attach or an IP Attach procedure will override this state again and make the dual mode mobile terminal 10 reachable.

Figure 11:
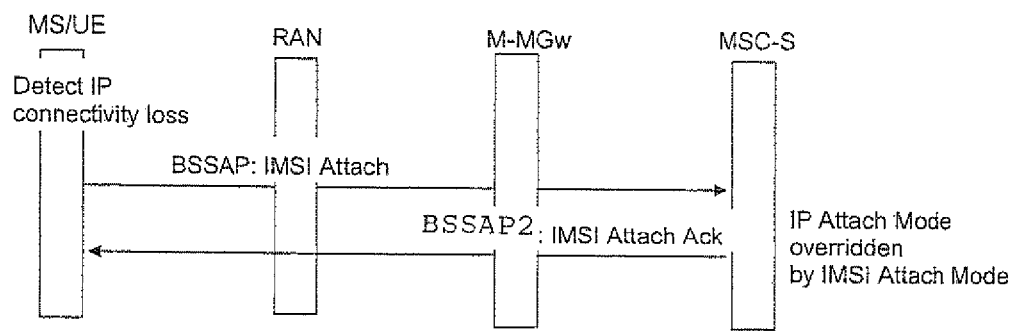
FIG. 11 shows an example of a mobile attachment mode control message flow according to the present invention.

FIG. 11 shows an example of a mobile attachment mode control message flow according to the present invention, i.e., illustrating a dual mode mobile terminal originating call in the "IP attached Mode".

As shown in FIG. 11, upon removing the dual mode mobile terminal 10 from the cradle or when the IP-connectivity in the cradle is lost, the dual mode mobile terminal 10 may perform an IMSI Attach procedure via the radio network. In that case, the switching node MSC-S may mark the dual mode mobile terminal 10 as IMSI attached and override the IP attach state without further user intervention.

Figure 12:
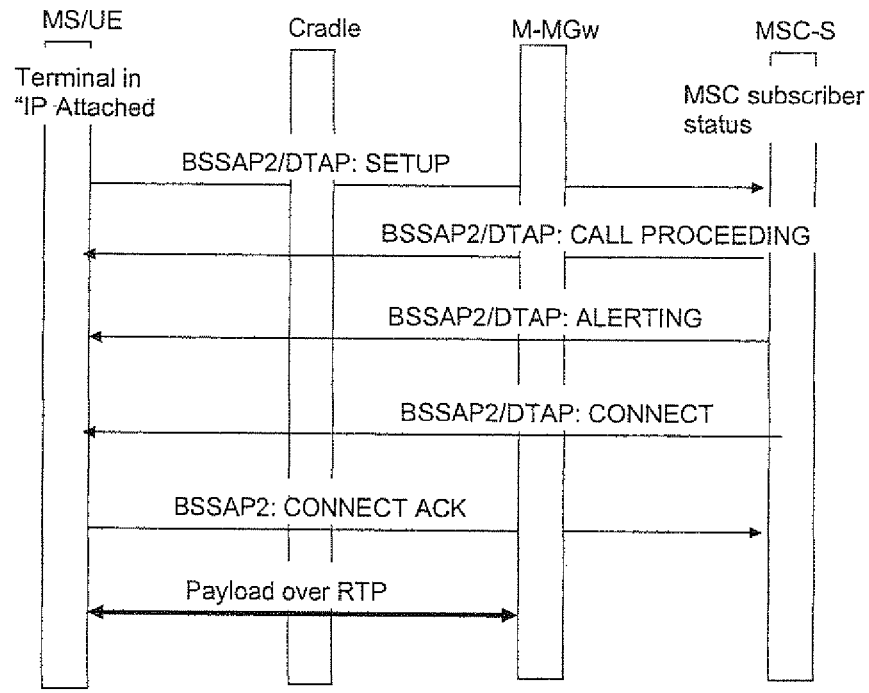
FIG. 12 shows an example of handling a dual mode mobile terminal originating call in the fixed attachment mode according to the present invention.

FIG. 12 shows an example of handling a dual mode mobile terminal originating call in the fixed attachment mode according to the present invention.

As shown in FIG. 12, when the dual mode mobile terminal 10 attempts a call, it will omit the radio resource procedures as specified by 3GPP and will send a DTAP "Setup" message via the cradle and the Internet BackBone 22 to the Core Network. The call-setup message flow on DTAP protocol level is identical to the 3GPP TS 24.008. After the BSSAP2/DTAP CONNECT ACKNOWLEDGE, the payload is sent/received via the Internet BackBone IP-BB 22 over RTP Real Time Protocol from/to the media gateway M-MGw 24.

Figure 13:
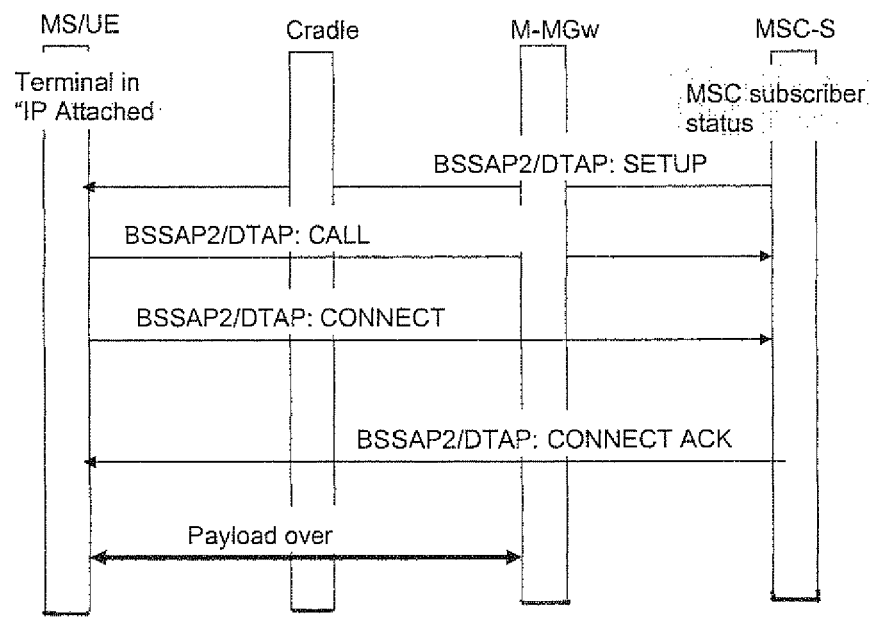
FIG. 13 shows an example of handling a dual mode mobile terminal terminating call in the fixed attachment mode according to the present invention.

FIG. 13 shows an example of handling a dual mode mobile terminal terminating call in the fixed attachment mode according to the present invention.

As shown in FIG. 13, when the switching node MSC-S 26 attempts a call, it will omit the Radio Resource procedures as specified by 3GPP and will send a DTAP "Setup" message via the media gateway M-MGw 24 and the Internet BackBone IP-BB 22 to the dual mode mobile terminal 10. It should be noted that no paging procedure will be applied by the switching node MSC-S 26 when the dual mode mobile terminal 10 is registered in "IP Attached Mode" and no BSSAP2 "IP Attach Periodic" message is outstanding.

Further, the call-setup message flow on DTAP protocol level is identical to the 3GPP TS 24.008. After the BSSAP2/DTAP CONNECT ACKNOWLEDGE, the payload is sent/received via the Internet BackBone IP-BB 22 over RTP from/to the media gateway M-MGw 24.

As explained above, according to the present invention the operator of a wireless communication network only needs to offer his subscriber, e.g., a new cradle and does not have to install new nodes in his wireless communication network. He can reuse all installed services.

Further, the operator can compete with voice over IP offers from other providers, as he is no longer bound to use the expensive radio network.

The invention claimed is:

1. A method of connecting a dual mode mobile terminal to a wireless communication network using a mobile attachment mode or a fixed attachment mode, comprising the steps:
   detecting an operative transfer state of the dual mode mobile terminal triggering a transfer from the mobile attachment mode to the fixed attachment mode;
   executing a mobile attachment mode detach from the wireless communication network in the mobile attachment mode upon detection of the operative transfer state;
   executing a fixed attachment mode attach to the same wireless communication network subsequent to execution of the mobile attachment mode detach to initiate the fixed attachment mode; and
   marking the dual mode mobile terminal as unavailable if the dual mode mobile terminal is in the fixed attachment mode and a periodic attach message is not received from the dual mode mobile terminal within a predetermined time period.

2. The method according to claim 1, further comprising:
   detecting a fixed attachment mode detach from the wireless communication network; and
   executing a mobile attachment mode attach to the same wireless communication network subsequent to execution of the fixed attachment mode detach to initiate the mobile attachment mode.

3. The method according to claim 1, further comprising receiving an attachment time period upon a successful fixed attachment mode attach to the wireless communication network for confirmation of fixed attachment mode availability.

4. The method according to claim 1, further comprising executing a call setup in the fixed attachment mode by using a fixed communication connectivity via a gateway node of the wireless communication network.

5. The method according to claim 4, further comprising executing a call receipt in the fixed attachment mode by using the fixed communication connectivity via the gateway node of the wireless communication network.

6. The method according to claim 1, further comprising after executing the fixed attachment mode attach, periodically sending an attachment message confirming availability through the fixed attachment mode to the wireless communication network.

7. A dual mode mobile terminal being connectable to a wireless communication network using a mobile attachment mode or a fixed attachment mode, comprising:
   an access mode control unit adapted to detect a operative transfer state of the dual mode mobile terminal triggering a transfer from the mobile attachment mode to the fixed attachment mode;
   a mobile mode attachment unit adapted to execute a mobile attachment mode detach from the wireless communication network to terminate the mobile attachment mode upon detection of the operative transfer state;
   a fixed mode attachment unit adapted to execute a fixed attachment mode attach to the same wireless communication network to initiate the fixed attachment mode subsequent to execution of the mobile attachment mode detach; and
   wherein a switching node is configured to mark the dual mode mobile terminal as unavailable when the dual mode mobile terminal is in the fixed attachment mode and a periodic attach message is not received from the dual mode mobile terminal within a predetermined time period.

8. A method of operating a switching node operated in a wireless communication network to establish a connection to a dual mode mobile terminal being connectable to the wireless communication network using a mobile attachment mode or a fixed attachment mode, comprising:
   detecting an attachment mode of the dual mode mobile terminal as the mobile attachment mode or the fixed attachment mode;
   exchanging control information with the dual mode mobile terminal according to the detected attachment mode;
   marking the dual mode mobile terminal as unavailable if the dual mode mobile terminal is in the fixed attachment mode and a periodic attach message is not received from the dual mode mobile terminal within a predetermined time period.

9. The method according to claim 8, further comprising verifying authentication of the dual mode mobile terminal prior to initiation of the fixed attachment mode.

10. The method according to claim 8, further comprising encrypting control information prior to forwarding thereof to the dual mode mobile terminal operating in the fixed attachment mode.

11. The method according to claim 8, further comprising forwarding an attachment time period to the dual mode mobile terminal for confirmation of fixed attachment mode availability.

12. The method according to claim 8, further comprising exchanging control information with the dual mode mobile terminal operating in the fixed attachment mode via a gateway node of the wireless communication network and using fixed communication connectivity.

13. The method according to claim 12, further comprising exchanging call setup control information for a dual mode mobile terminal originating call in the fixed attachment mode via the gateway node of the wireless communication network and using fixed communication connectivity.

14. The method according to claim 12, further comprising exchanging a call forwarding control information for a dual mode mobile terminal terminating call in the fixed attachment mode using the gateway node of the wireless communication network and the fixed communication connectivity.

15. A switching node operated in a wireless communication network to establish a connection to a dual mode mobile terminal being connectable to the wireless communication network using a mobile attachment mode or a fixed attachment mode, comprising:
   an access mode control unit adapted to detect a attachment mode of the dual mode mobile terminal as the mobile attachment mode or the fixed attachment mode;
   a communication control unit adapted to exchange control information with the dual mode mobile terminal according to the detected attachment mode; and
   the switching node further configured to mark the dual mode mobile terminal as unavailable when the dual mode mobile terminal is in the fixed attachment mode and a periodic attach message is not received from the dual mode mobile terminal within a predetermined time period.

* * * * *

UNITED STATES PATENT AND TRADEMARK OFFICE
CERTIFICATE OF CORRECTION

Page 1 of 1

PATENT NO. : 8,583,172 B2
APPLICATION NO. : 13/321360
DATED : November 12, 2013
INVENTOR(S) : Essigmann It is certified that error appears in the above-identified patent and that said Letters Patent is hereby corrected as shown below:

Specification

In Column 6, Line 18, delete "gateway" and insert -- gateway 24 --, therefor.

In Column 6, Line 38, delete "a attachment" and insert -- an attachment --, therefor.

In Column 6, Line 50, delete "encryption unit 34" and insert -- encryption unit 36 --, therefor.

In Column 7, Line 65, delete "following" and insert -- following. --, therefor.

Claims

In Column 10, Line 50, in Claim 15, delete "a attachment" and insert -- an attachment --, therefor.

Signed and Sealed this
Twenty-eighth Day of June, 2016

Michelle K. Lee
*Director of the United States Patent and Trademark Office*